US010664862B1

(12) United States Patent
Szulczewski et al.

(10) Patent No.: US 10,664,862 B1
(45) Date of Patent: May 26, 2020

(54) TOPIC INFERENCE BASED CONTEXTUAL CONTENT

(75) Inventors: Piotr Szulczewski, San Francisco, CA (US); Sheng Zhang, San Jose, CA (US); Jack Xie, San Francisco, CA (US)

(73) Assignee: CONTEXTLOGIC, INC., San Francisco, CA (US)

( * ) Notice: Subject to any disclaimer, the term of this patent is extended or adjusted under 35 U.S.C. 154(b) by 783 days.

(21) Appl. No.: 13/527,517

(22) Filed: Jun. 19, 2012

Related U.S. Application Data (60) Provisional application No. 61/499,544, filed on Jun. 21, 2011.

(51) Int. Cl.
| | |
|---|---|
| *G06Q 30/02* | (2012.01) |
| *G06Q 50/00* | (2012.01) |
| *G06F 40/20* | (2020.01) |
| *G06F 40/211* | (2020.01) |
| *G06F 40/205* | (2020.01) |
| *G06F 40/30* | (2020.01) |

(52) U.S. Cl.
CPC ......... *G06Q 30/0251* (2013.01); *G06F 40/20* (2020.01); *G06F 40/205* (2020.01); *G06F 40/211* (2020.01); *G06F 40/30* (2020.01); *G06Q 30/02* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 7,519,529 | B1* | 4/2009 | Horvitz | G06F 17/279 704/7 |
| 7,716,198 | B2* | 5/2010 | Meyerzon | G06F 17/30684 707/706 |
| 2011/0258054 | A1* | 10/2011 | Pandey et al. | 705/14.72 |
| 2011/0258188 | A1* | 10/2011 | Abdalmageed | G06F 17/30796 707/736 |
| 2012/0166179 | A1* | 6/2012 | Tirumalachetty et al. | 704/9 |

OTHER PUBLICATIONS

Mingliang Zhu; Weiming Hu; Ou Wu; "Topic Detection for Discussion Threads with Domain Knowledge" (2010); IEEE p. 545-548 (Year: 2010).*

* cited by examiner

*Primary Examiner* — Sam Refai
*Assistant Examiner* — Rashida R Shorter
(74) *Attorney, Agent, or Firm* — Schwegman Lundberg & Woessner, P.A.

(57) ABSTRACT

Techniques to provide contextual content are disclosed. In various embodiments, a set of topics inferred programmatically from a corpus of raw content data is obtained. An input is received. A topic with which the input is associated is determined, based at least in part on the input and the set of topics. A contextual content associated with the topic is provided.

30 Claims, 10 Drawing Sheets

TOPIC INFERENCE BASED CONTEXTUAL CONTENT

CROSS REFERENCE TO OTHER APPLICATIONS

This application claims priority to U.S. Provisional Patent Application No. 61/499,544 entitled TOPIC INFERENCE BASED ONLINE ADVERTISING, filed Jun. 21, 2011, which is incorporated herein by reference for all purposes.

BACKGROUND OF THE INVENTION

Attempts have been made to provide contextually relevant online content, for example, in response to search or other queries and/or to select and serve online ads. Typically, content is categorized based on an edited or otherwise at least partly human curated taxonomy of topics and/or categories. To keep the set of topics or categories at a human-manageable number, topics tend to describe content at a fairly generic and not very granular level.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Topic inference based techniques to provide contextually relevant content are disclosed. In various embodiments, natural language processing techniques are used to infer programmatically, based in various embodiments on a corpus of documents that includes web pages, social signals (e.g., Facebook or Twitter feeds), and other online, dynamic content, a set of topics and/or categories that describe content based on meaning. A context may be determined in various embodiments based on content currently being viewed, such as a web page; content viewed in the past or otherwise interacted with by a user; product information or other content that describes a product or service; user profile information, determined in some embodiments through offline processing of content interacted with previously by a user and/or subject matter in which a user has indicated interest explicitly, for example via a user interface; and context information provided explicitly, such as by inputting text that indicates a subject and/or content of interest.

Figure 1:
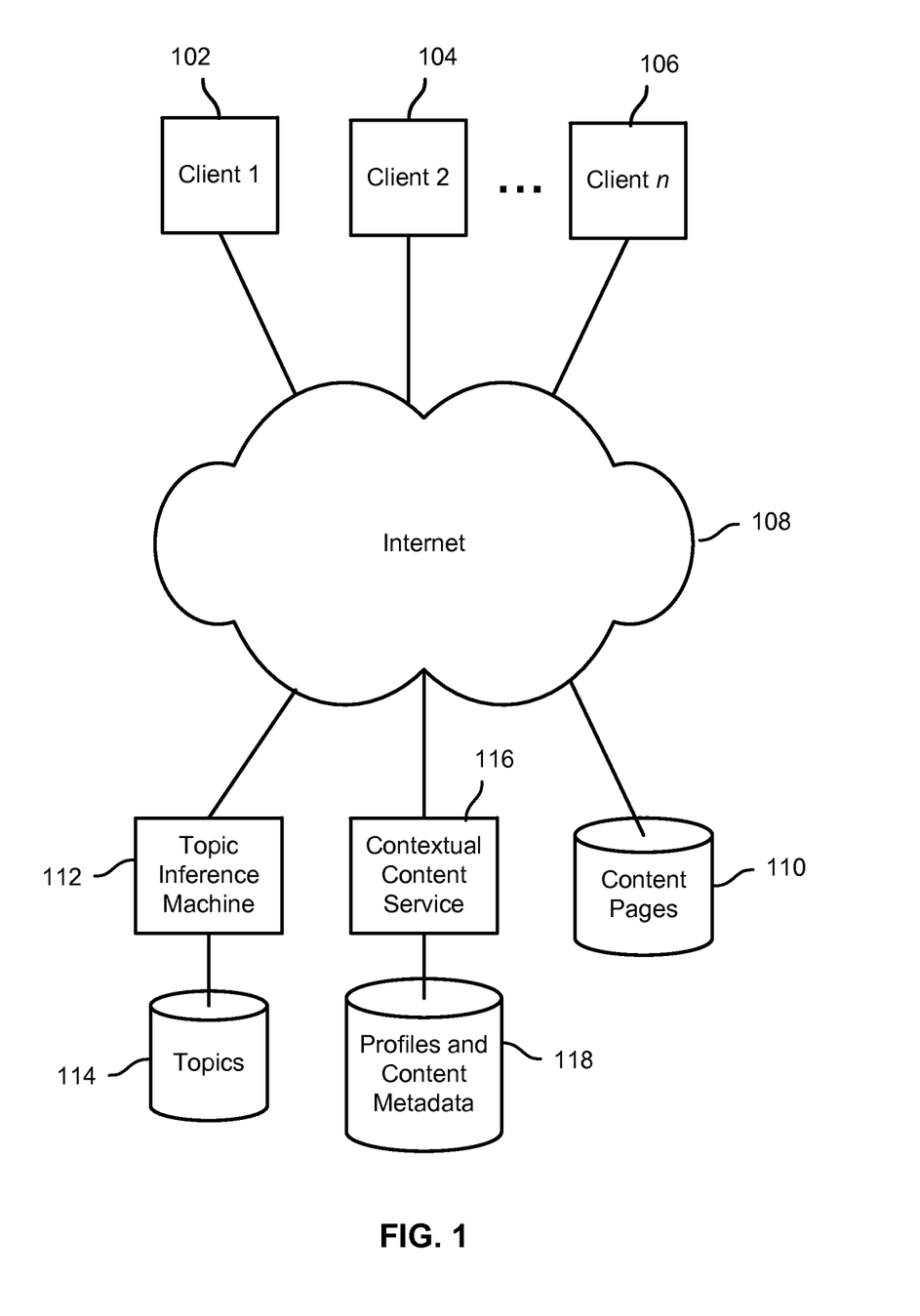
FIG. 1 is a block diagram illustrating an embodiment of a system to determine and provide contextually relevant content.

FIG. 1 is a block diagram illustrating an embodiment of a system to determine and provide contextually relevant content. In the example shown, a plurality of client systems represented in FIG. 1 by clients 102, 104, and 106 access content via the Internet 108, such as content pages 110, which may include web pages and/or other content. A topic inference machine 112 crawls content pages 110 to accumulate a corpus of raw content data and performs natural language processing to infer from the raw content a set of topics 114 usable to describe the semantic information (i.e., meaning) of content. In some embodiments, topic inference machine 112 crawls published web pages and other online and related content such as social network feeds. A contextual content service 116, e.g., provided by an application or other services running on a server or other machine, is configured to provide contextually relevant content based at least in part on topics 114. In the example shown, user profile and content metadata describing the content of web pages, online ads, product information pages, etc. are stored in a profiles and content metadata store 118.

Figure 2:
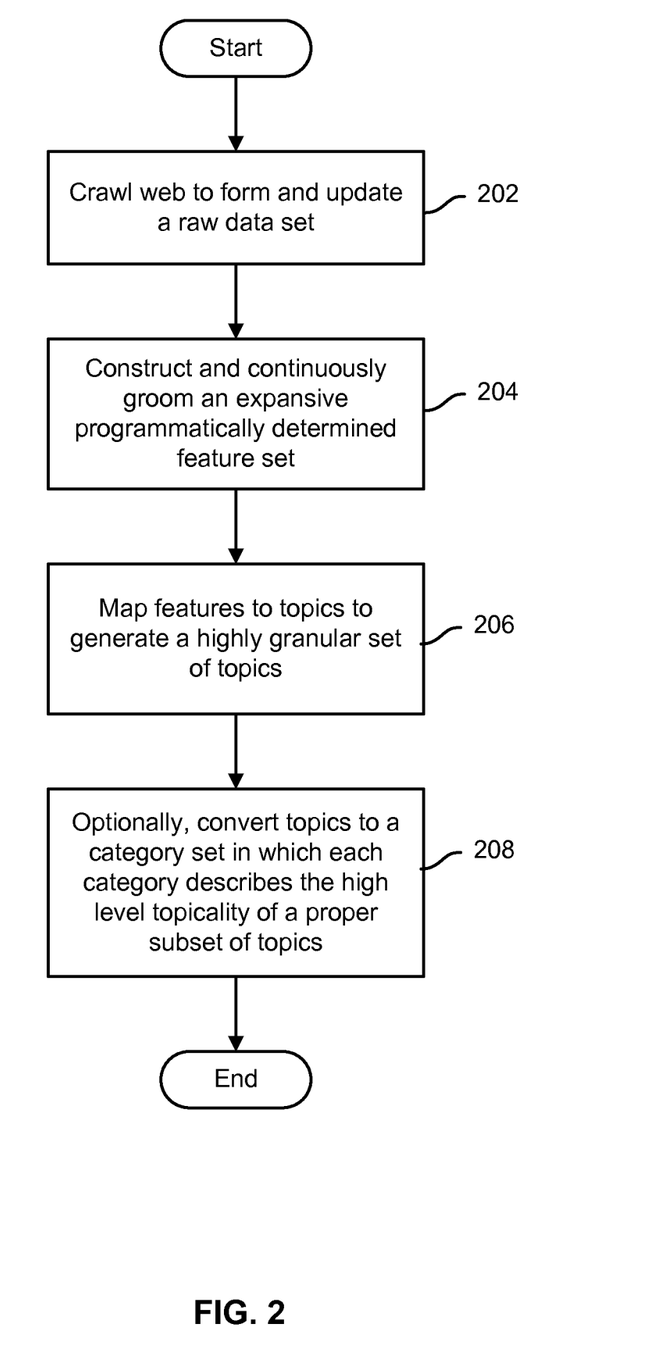
FIG. 2 is a flow diagram illustrating an embodiment of a process to infer topics and/or categories.

FIG. 2 is a flow diagram illustrating an embodiment of a process to infer topics and/or categories. In the example shown, the web is crawled to build and update a raw set of content data (202). Examples of content crawled in various embodiments include without limitation web pages; product information pages and/or database records; social signals such as social network feeds and tracked behavior, such as "likes" and game or other application participation; and other content. In some embodiments, more dynamic data sources, such as social network signals, may be weighted more heavily than more static content, such as web pages, in the process of inferring topics, for example to ensure that the topic set adapts adequately quickly to include emerging concepts and terms. An expansive feature set is constructed programmatically by performing natural language processing on the raw content, and the feature set is groomed and updated programmatically, on an ongoing basis, to focus on a set of features likely to be useful to describe content, for example by using thresholds and filtering to ignore words and phrases that occur in only a relatively small number of documents or that do not continue to be used over time (204). The determined features are mapped to a highly granular set of topics (206). In various embodiments, features determined to be very similar to one another, e.g., those that use the same or nearly the same words, those that occur together very frequently, etc., are collapsed into topics. Optionally, topics are converted to a category set in which each category describes the high level topicality of a proper subset of topics (208). In some embodiments, the process of converting topics to categories is similar the one used to collapse features to generate topics.

Figure 3:
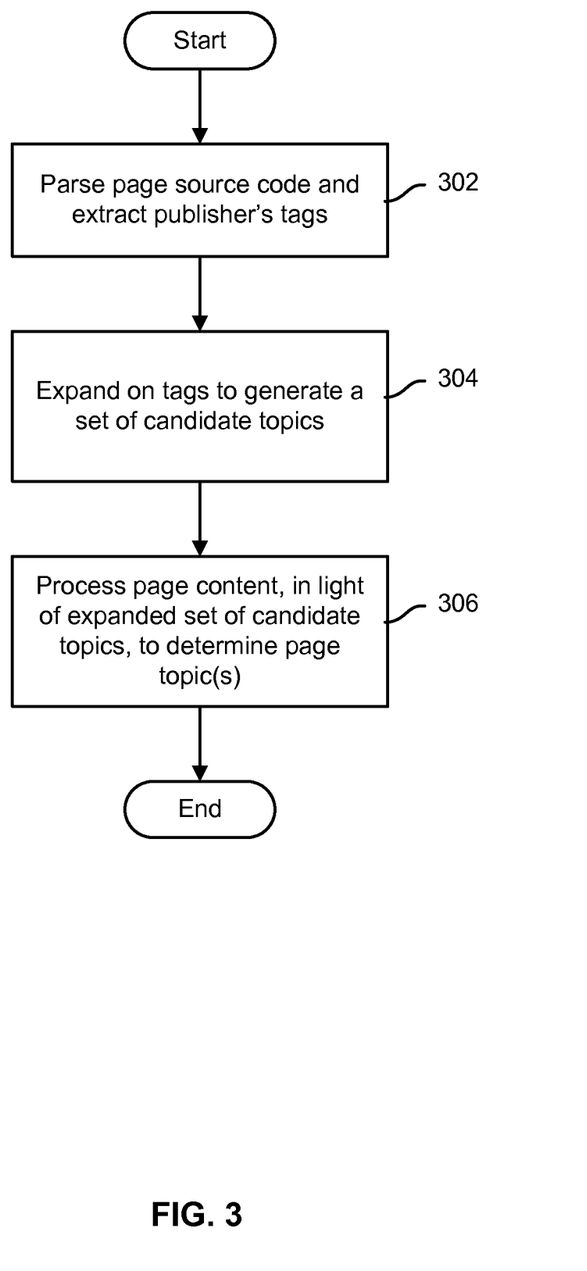
FIG. 3 is a flow diagram illustrating an embodiment of a process to infer topics.

FIG. 3 is a flow diagram illustrating an embodiment of a process to infer topics. In the example shown, existing tags and/or other information that may already existing for a web page or other document is used to inform the topic inference process. Page source (e.g., HTML) is parsed to extract page content and any publisher or other tags or information that may described the semantic content (meaning) of the page (302). The resulting tags or other metadata are expanded to include in a set of candidate topics other topics, selected from a set determined as described in FIG. 2 for example, that are a closely related to topics with which the tags are associated (304). The page content is processed, in light of the expanded set of candidate topics, to determine topics to be associated with the page (306). For example, natural language processing techniques are applied to the content itself to infer one or more topics, with the process being information by the expanded set of candidate topics, for example by weighting or otherwise biasing the process in favor of topics included in the set. Using this approach, the benefit of existing tags or other metadata that accurately describes the content of a page is realized without giving too much way to publisher or other user supplied tags that do not describe as accurately the semantic content of the page.

Figure 4:
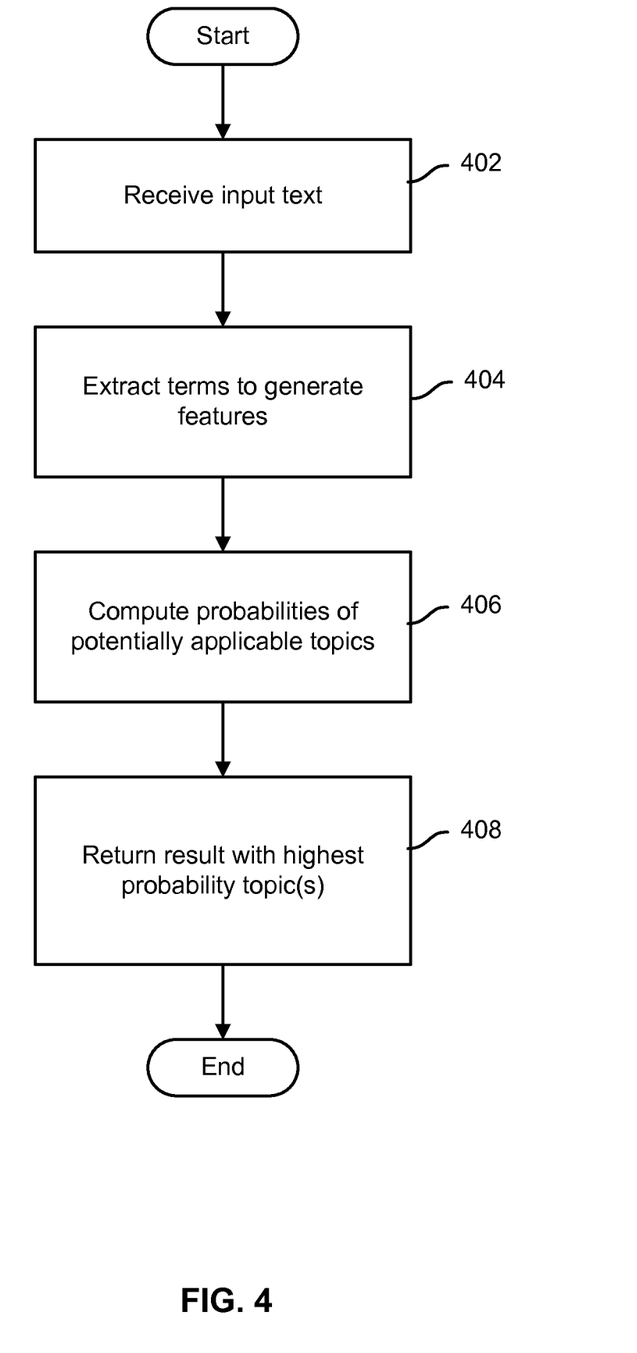
FIG. 4 is a flow diagram illustrating an embodiment of a process to infer topics and/or categories.

FIG. 4 is a flow diagram illustrating an embodiment of a process to infer topics and/or categories. In various embodiments, the process of FIG. 4 is used to infer topics or categories from input text or other input, such as a URL or other identification of a web page, content-containing object, or other content. In the example shown, input text is received (402), for example as a result of having been typed into a text entry box in a user interface page. Terms are extracted from the input text to generate features (404), e.g., words and phrases believed to have or impart meaning. The extracted features are used to compute, based on previously built semantic models (e.g., as described above in connection with FIG. 2), probabilities of topics and/or categories that describe the meaning of the text or other input (406). A result indicating the n highest probability topics is returned (408). In some embodiments, an emphasis is placed and realized programmatically on returning results that accurately identify the topic of received text or other input. In some such embodiments, a null result is returned if too many topics each having a relatively low (or moderate) probability are identified, and a result is returned instead only if one or two topics (or categories) are determined to have a high likelihood (probability) or describing the meaning of the input text or other input.

Figure 5:
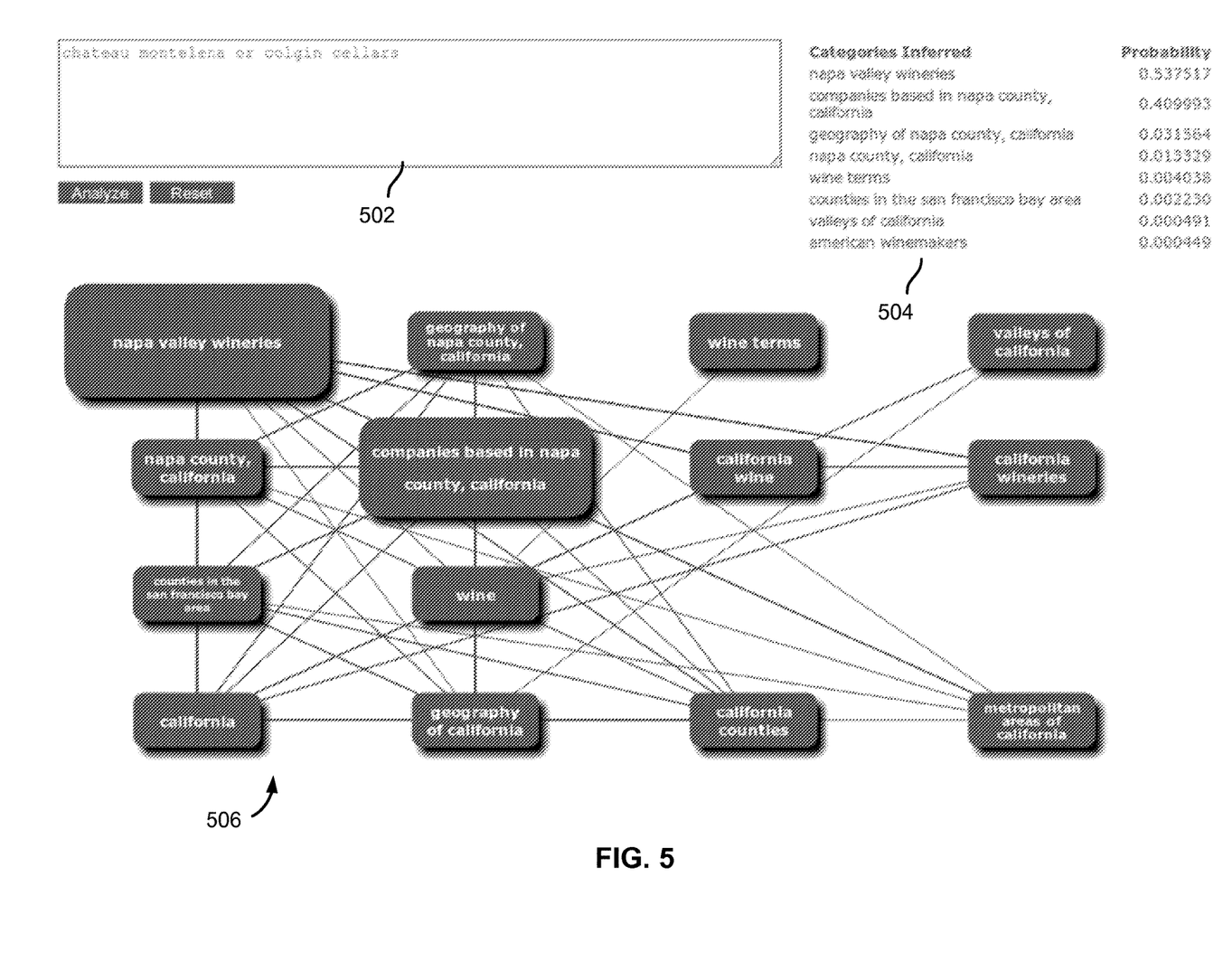
FIG. 5 is a block diagram illustrating an embodiment of a user interface to infer topics and/or categories.

FIG. 5 is a block diagram illustrating an embodiment of a user interface to infer topics and/or categories. In the example shown, the user interface includes a text entry box 502 configured to receive user input in the form of user-entered text. On selection by the user of the "analyze" button, in this example a set of categories determined to be associated with the entered text are displayed in an inferred categories display area 504, and for each category listed an associated probability that the corresponding category most accurately classifies the entered text is indicated. In the example shown, a category map 506 is provided to represent visually the relative likelihood (probability) of the returned categories and at least the more significant relationships between them (e.g., based on co-occurrence, popularity, and/or other measures of mutual relevance). In some embodiments, a display such as the one shown in FIG. 5 represents visually a directly acyclic graph (DAG) of topics/categories, where the nodes record the names, importance, popularity, etc. of the topics, and the connectors (arcs/edges) represent the relevancy connection between a granular topic and a more general one.

Figure 6:
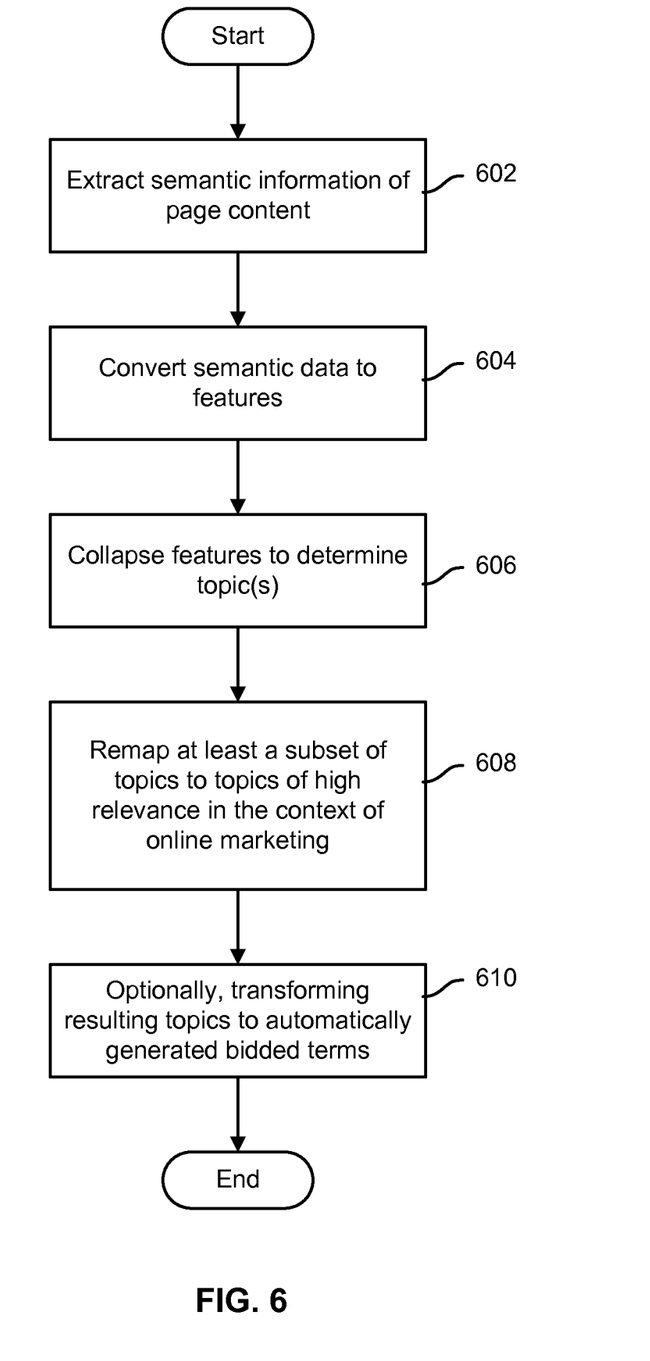
FIG. 6 is a flow diagram illustrating an embodiment of a process to infer topics and/or categories.

FIG. 6 is a flow diagram illustrating an embodiment of a process to infer topics and/or categories. In various embodiments, the process of FIG. 6 is used to identify and provide content, such as ad content, that is contextually relevant to a display page or other primary content. One commercial use of such an approach may be to provide ads more likely to be clicked through, thereby increasing advertising revenue. In the example shown, semantic information is extracted from a display page, such as a web page, to and/or with respect to which other contextually relevant content, such as ad content, is desired to be identified (602). The semantic data is converted to a set of features (604), and the features are collapsed to determine a set of topics (606). At least a subset of the topics, for example those determined most likely to be relevant to the display page, are remapped to topics of high relevance in the applicable context, such as online marketing in the case of use of the process of FIG. 6 to facilitate online advertising (608). For example, the inferred topic "health care in California" may be mapped to two separate topics, e.g., "health care" and "California", since entirely different advertising content may be appropriate for the two separate topics. In some embodiments, inferred topics may be mapped to topics included in a relatively limited and hierarchically organized set of topics, such as to one or more topics included in an edited taxonomy of topics, such as those maintained by Google, Yahoo, and other online advertising service providers. Referring further to FIG. 6, optionally the inferred and remapped topics are transformed to generate automatically a set of bidded terms (610), for example terms with respect to which bids may be desired to be submitted to secure advertising placement in auction based online advertising regimes such as Google AdSense™.

In some embodiments, user profile information may be incorporated in the selection of contextually relevant content. For example, if the user has visited recently pages on a topic A but currently is viewing a page about a topic B, ads or other content associated with topic A may be served if, for example, no advertising (or other) content associated with topic B is available.

Figure 7:
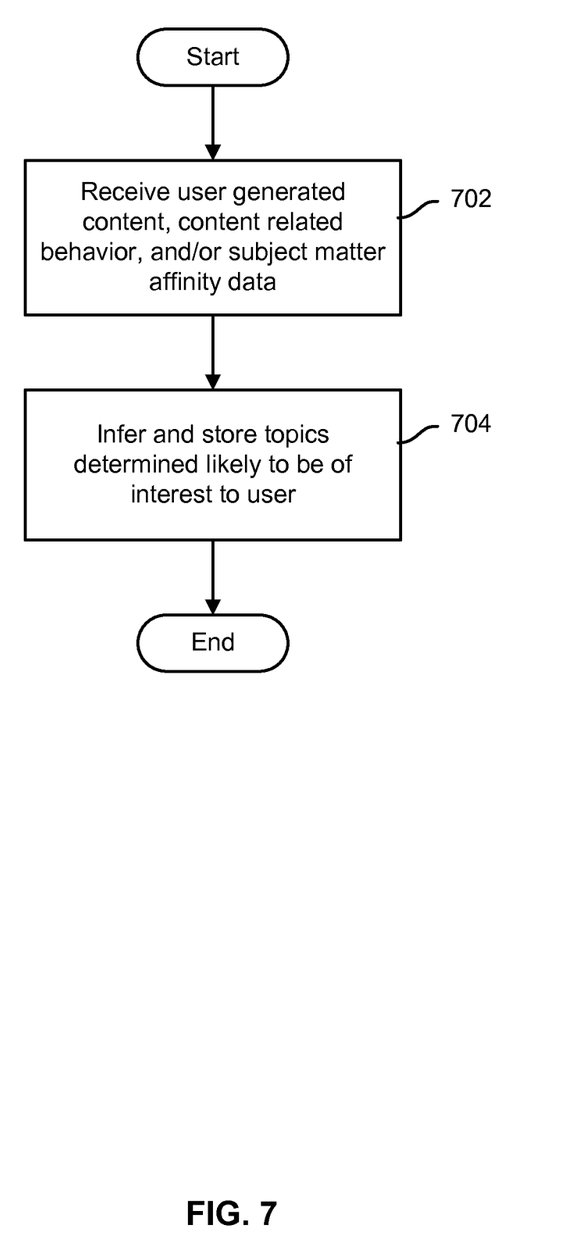
FIG. 7 is a flow diagram illustrating an embodiment of a process to build a user profile.

FIG. 7 is a flow diagram illustrating an embodiment of a process to build a user profile. In various embodiments, the process of FIG. 7 is used to learn which topics are likely to be of interest to a user. In the example shown, one or more of user generated content (e.g., Facebook or Twitter postings, blog entries, etc.), user behavior with respect to content (e.g., pages or entities "liked" on Facebook), and/or other data indicating the user's affinity to certain content (e.g., interest indicated explicitly by user, for example in response to a prompt displayed in a web page or other interface, etc.) are processed to obtain a set of raw data and/or metadata (702). Content and/or content or topic indicating behavior and/or input are processed to infer and store topics determined to be likely to be of interest to the user (704), e.g., topics for which the system has determined based on content and/or other data obtained at (702) are highly probable to described content the user would be interested in.

In some embodiments, ad unit candidates (or other contextual content candidates) may be processed, for example offline, to determine the topicality of such content and to be prepared to provide ad or other content that is relevant to the same (or a related) topics as the display or other context page being viewed by the user and in and/or adjacent to which the ad or other contextually relevant content will be displayed.

Figure 8:
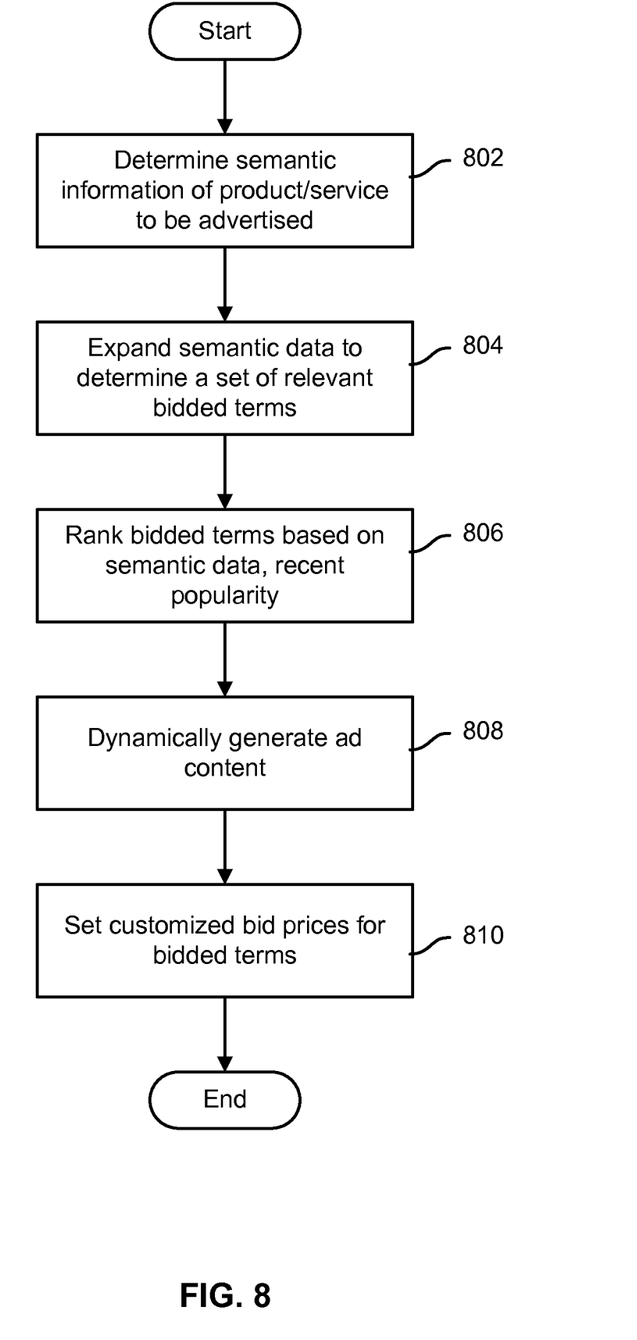
FIG. 8 is a flow diagram illustrating an embodiment of a process to determine automatically an online advertising plan for a product or service.

In some embodiments, techniques disclosed herein are applied to devise and implement a more effective approach to advertising a product or service. FIG. 8 is a flow diagram illustrating an embodiment of a process to determine automatically an online advertising plan for a product or service. In the example shown, semantic information regarding a product or service to be advertised is determined programmatically (802). For example a web or other display page that describes the product or service, such as a product landing page at the website of an online retailer that sells the product, is crawled. The semantic data is expanded to determine a set of relevant bidded terms (804). In some embodiments, the bidded terms are determined based on the semantic information as described in connection with FIG. 6. The bidded terms are ranked based on semantic data such as relevancy to the topics with which the product or service have been determined to be associated, recent popularity, etc. (806). Ad content (creative) is generated dynamically, e.g., to target the particular and granular topics of interest to that user, ad content particular relevant to the topic inferred for the page, etc. (808). For example, an ad for a particular brand and/or style of shoe may be built dynamically, such as by populating a template with an image and/or other data for the particular shoe, as opposed to serving a previously created but more generic shoe ad. Customized bid prices are set for bidded terms (810). For example, a higher bid may be placed for a bidded term determined to be closely related to a highly ranked topic inferred for the ad destination page.

Figure 9:
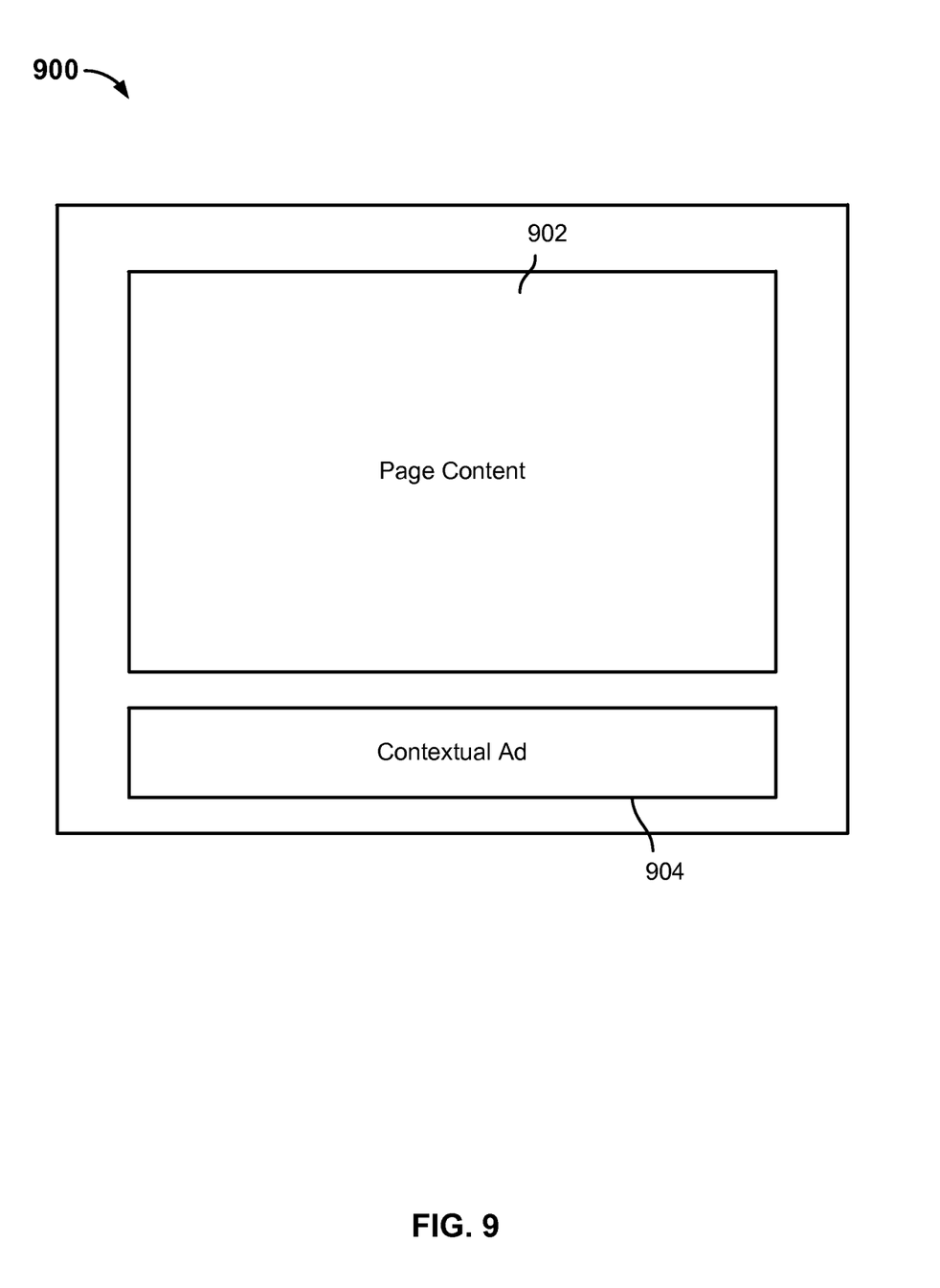
FIG. 9 is a block diagram illustrating an embodiment of a page in which contextually relevant content is displayed.

FIG. 9 is a block diagram illustrating an embodiment of a page in which contextually relevant content is displayed. In the example shown, a display page 900 includes a primary page content 902, e.g., web page content, and a banner ad display area 904 in which in various embodiments a contextually relevant ad or other content may be determined as described herein and displayed. Other examples include a pop-up or other display area elsewhere in the page 900 or elsewhere on the display, such as in another window.

Figure 10:
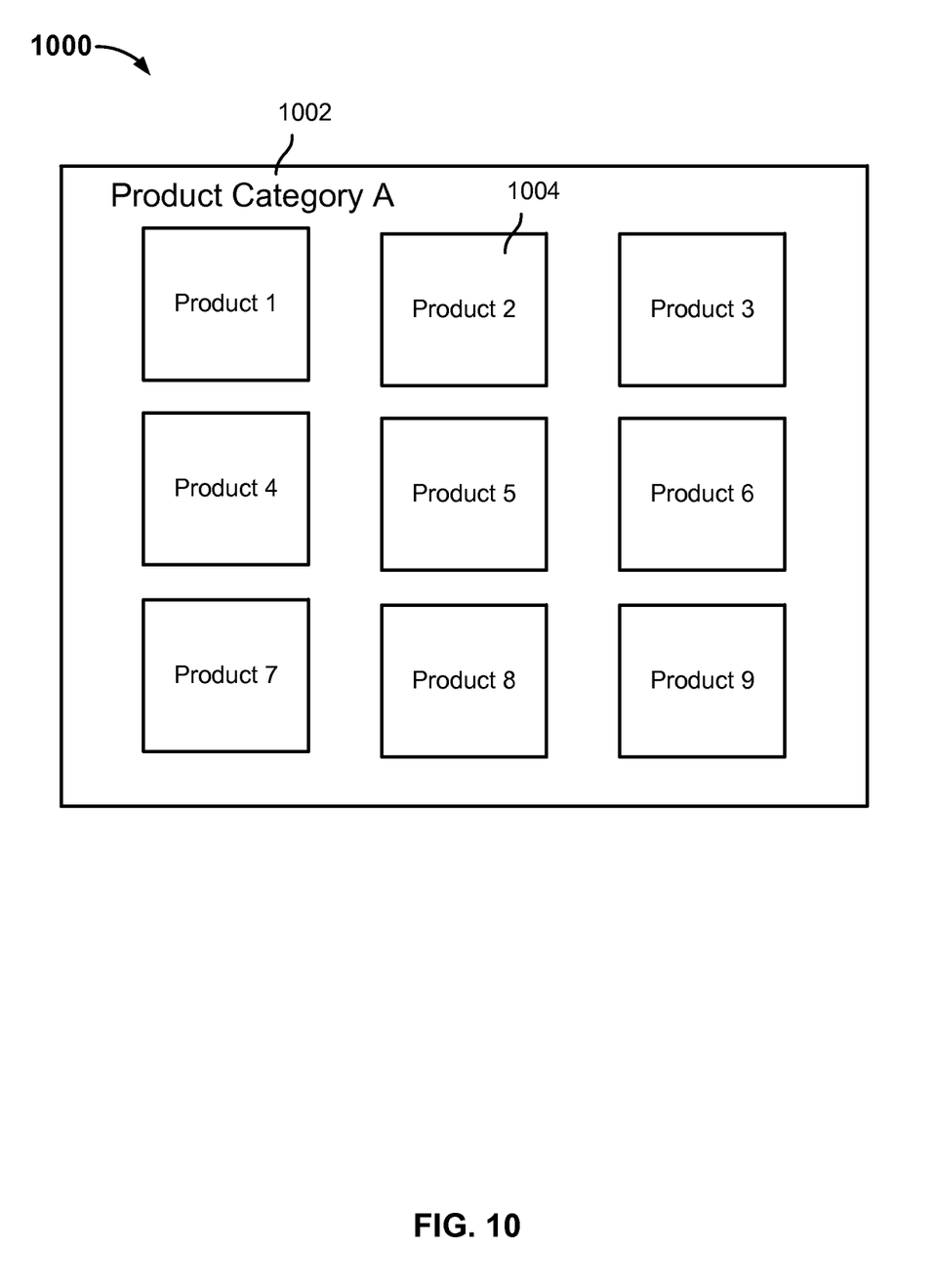
FIG. 10 is a block diagram illustrating an embodiment of a page in which contextually relevant content is displayed.

FIG. 10 is a block diagram illustrating an embodiment of a page in which contextually relevant content is displayed. In this example, an application or other user interface 1000 includes a topic text 1002, which indicates a topic or category for data displayed in a plurality of tiles 1004. In some embodiments, the topic indicated by topic text 1002 is one determined at least in part by techniques disclosed herein as one that is likely to be of interest to the user, for example based on content the user has generated and/or interacted with recently, such as page visits, social network "likes" and postings, etc. In this example, the topic is a product category, and in some embodiments each of the tiles 1004 would include a thumbnail or other image and/or text describing a particular product believed to be likely to be of interest to the user. In one embodiment, users are provided an incentive to interact with the system, for example to upload products and/or associated information and/or to participate in games or other activities calculated to provide insights into the topics and/or categories that are likely to be of interest to the user. Likewise, techniques disclosed herein may be used to identify products and/or other content associated with topics likely to be of interest to the user, for example by processing product page content, etc.

By inferring topics programmatically and directly from the content of display pages, advertisements, product information and the like, as opposed to relying on human editors to create a limited, hierarchical set of topics, an expansive set of more granular, specific topics is created, as opposed to the fewer, more general topics included in a typical prior art taxonomy. Using such granular topics to determine a relevant context (e.g., based on display page content, content associated with a user previously, etc.) and also to identify and/or create contextually relevant content provides a much higher likelihood of providing contextually relevant content that will be of interest to a user viewing the context page, thereby providing enhanced monetization and other commercial opportunities, such as higher click through, product sales, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
crawling, by one or more processors, through one or more electronic data sources to obtain a set of previously viewed online content data of a user, the one or more electronic data sources including one or more web pages or other online content viewed by the user;
inferring, by the one or more processors, one or more topics associated with the set of previously viewed online content data, the inferring of the one or more topics comprising:
 extracting, by the one or more processors, metadata from the set of previously viewed online content data at least in part by parsing through source code associated with the one or more electronic data sources, the metadata is indicative of the one or more topics, and
 programmatically inferring the one or more topics by applying a natural language processing model to the set of previously viewed online content data, the inferring one or more topics includes weighing content obtained from a dynamic source of the one or more electronic data sources more heavily than content obtained from a static source of the one or more electronic data sources, and the inferring of the one or more topics is based at least in part on topics weighted based on the metadata;
identifying, by the one or more processes, a hierarchical taxonomy of topics;
generating, by the one or more processors, a set of remapped topics based at least in part on mapping, using a directed acyclic graph of the one or more inferred topics, each of the one or more inferred topics to a corresponding broader topic of the hierarchical taxonomy of topics, the set of remapped topics comprising a first remapped topic and a second remapped topic that is different than the first remapped topic;

determining, by the one or more processors, that user input data from the user matches the first remapped topic; and providing, by the one or more processors, a first contextual content item on a web page being viewed by the user, the web page being associated with the second remapped topic, a second contextual content item associated with the second remapped topic being unavailable to be provided, the first contextual content item being associated with the first remapped topic, the first contextual content item being provided based at least in part on the second contextual content item of the second remapped topic generated from the one or more inferred topics being unavailable.

2. The method of claim 1, further comprising:
obtaining the set of previously viewed online content data at least in part by receiving a social network feed or other social signal.

3. The method of claim 1, wherein the one or more topics are inferred by determining programmatically a relevance of a candidate topic to a block of content data included in the set of previously viewed online content data.

4. The method of claim 1, wherein topics are inferred by determining programmatically a popularity of a candidate topic.

5. The method of claim 1, wherein the set of remapped topics is generated at least in part by generating and evaluating a set of features.

6. The method of claim 1, wherein the set of remapped topics is generating at least in part by collapsing a plurality of features into a single topic.

7. The method of claim 6, wherein each feature comprises a word or phrase that occurs with at least a threshold level of frequency in at least a relevant portion of the set of previously viewed online content data.

8. The method of claim 1, further comprising combining topics to generate a set of one or more categories.

9. The method of claim 1, wherein the user input data comprises one or more of: text input data, user profile data of the user.

10. The method of claim 1, wherein the first contextual content item comprises one or more items of text, images, or clickable links.

11. The method of claim 9, further comprising: building the user profile data at least in part by processing network site content with which the user is associated on the network site.

12. The method of claim 11, wherein the network site content with which the user is associated includes one or more pages that the user has visited, content in which the user has expressed an interest, a content determined based at least in part on social network feed information associated with the user.

13. The method of claim 1, wherein the hierarchical taxonomy of topics comprises a plurality of online commercial topics for clickable online content.

14. A system comprising:
one or more processors of a machine; and
a memory storing instructions that, when executed by the one or more processors, cause the machine to perform operations comprising:

crawl through one or more electronic data sources to obtain a set of previously viewed online content data of a user, the one or more electronic data sources including one or more web pages or other online content viewed by the user;

infer one or more topics associated with the set of previously viewed online content data, the inferring of the one or more topics comprising:

extracting metadata from the set of previously viewed online content data at least in part by parsing through source code associated with the one or more electronic data sources, the metadata is indicative of the one or more topics, and programmatically inferring the one or more topics by applying a natural language processing model to the set of previously viewed online content data, the inferring one or more topics includes weighing content obtained from a dynamic source of the one or more electronic data sources more heavily than content obtained from a static source of the one or more electronic data sources, and the inferring of the one or more topics is based at least in part on topics weighted based on the metadata;

identify a hierarchical taxonomy of topics;

generate a set of remapped topics based at least in part on mapping, using a directed acyclic graph of the one or more inferred topics, each of the one or more inferred topics to a corresponding broader topic of the hierarchical taxonomy of topics, the set of remapped topics comprising a first remapped topic and a second remapped topic that is different than the first remapped topic;

determine that user input data from the user matches the first remapped topic; and provide a first contextual content item on a web page being viewed by the user, the web page being associated with the second remapped topic, a second contextual content item associated with the second remapped topic being unavailable to be provided, the first contextual content item being associated with the first remapped topic, the first contextual content item being provided based at least in part on the second contextual content item of the second remapped topic generated from the one or more inferred topics being unavailable.

15. The system of claim 14, the operations further comprising:
obtaining the set of previously viewed online content data at least in part by receiving a social network feed or other social signal.

16. The system of claim 14, wherein the one or more topics are inferred by determining programmatically a relevance of a candidate topic to a block of content data included in the set of previously viewed online content data.

17. The system of claim 14, wherein topics are inferred by determining programmatically a popularity of a candidate topic.

18. The system of claim 14, wherein the set of remapped topics is generated at least in part by generating and evaluating a set of features.

19. The system of claim 14, wherein the set of remapped topics is generated at least in part by collapsing a plurality of features into a single topic.

20. The system of claim 19, wherein each feature comprises a word or phrase that occurs with at least a threshold level of frequency in at least a relevant portion of the set of previously viewed online content data.

21. The system of claim 14, the operations further comprising combining topics to generate a set of one or more categories.

22. The system of claim 14, wherein the user input data comprises one or more of: text input data, user profile data of the user.

23. The system of claim 14, wherein the first contextual content item comprises one or more items of text, images, or clickable links.

24. The system of claim 22, the operations further comprising: building the user profile data at least in part by processing network site content with which the user is associated on the network site.

25. The system of claim 24, wherein the network site content with which the user is associated includes one or more pages that the user has visited, content in which the user has expressed an interest, content determined based at least in part on social network feed information associated with the user.

26. The system of claim 14, wherein the hierarchical taxonomy of topics comprises a plurality of online commercial topics for clickable online content.

27. A non-transitory computer readable storage medium comprising instructions that, when executed by a machine, cause the machine to perform operations comprising:
crawl through one or more electronic data sources to obtain a set of previously viewed online content data of a user, the one or more electronic data sources including one or more web pages or other online content viewed by the user;
infer one or more topics associated with the set of previously viewed online content data, the inferring of the one or more topics comprising:
extracting metadata from the set of previously viewed online content data at least in part by parsing through source code associated with the one or more electronic data sources, the metadata is indicative of the one or more topics, and
programmatically inferring the one or more topics by applying a natural language processing model to the set of previously viewed online content data, the inferring one or more topics includes weighing content obtained from a dynamic source of the one or more electronic data sources more heavily than content obtained from a static source of the one or more electronic data sources, and the inferring of the one or more topics is based at least in part on topics weighted based on the metadata;
identify a hierarchical taxonomy of topics;
generate a set of remapped topics based at least in part on mapping, using a directed acyclic graph of the one or more inferred topics, each of the one or more inferred topics to a corresponding broader topic of the hierarchical taxonomy of topics, the set of remapped topics comprising a first remapped topic and a second remapped topic that is different than the first remapped topic;
determine that user input data from the user matches the first remapped topic; and
provide a first contextual content item on a web page being viewed by the user, the web page being associated with the second remapped topic, a second contextual content item associated with the second remapped topic being unavailable to be provided, the first contextual content item being associated with the first remapped topic, the first contextual content item being provided based at least in part on the second contextual content item of the second remapped topic generated from the one or more inferred topics being unavailable.

28. The non-transitory computer readable storage medium of claim 27, the operations further comprising:
obtaining the set of previously viewed online content data at least in part by receiving a social network feed or other social signal.

29. The non-transitory computer readable storage medium of claim 27, wherein the one or more topics are inferred by determining programmatically a relevance of a candidate topic to a block of content data included in the set of previously viewed online content data.

30. The non-transitory computer readable storage medium of claim 27, wherein topics are inferred by determining programmatically a popularity of a candidate topic.

* * * * *